No. 653,575. Patented July 10, 1900.
M. J. HALL.
BOOT TREE.
(Application filed Dec. 6, 1899.)
(No Model.) 2 Sheets—Sheet 1.
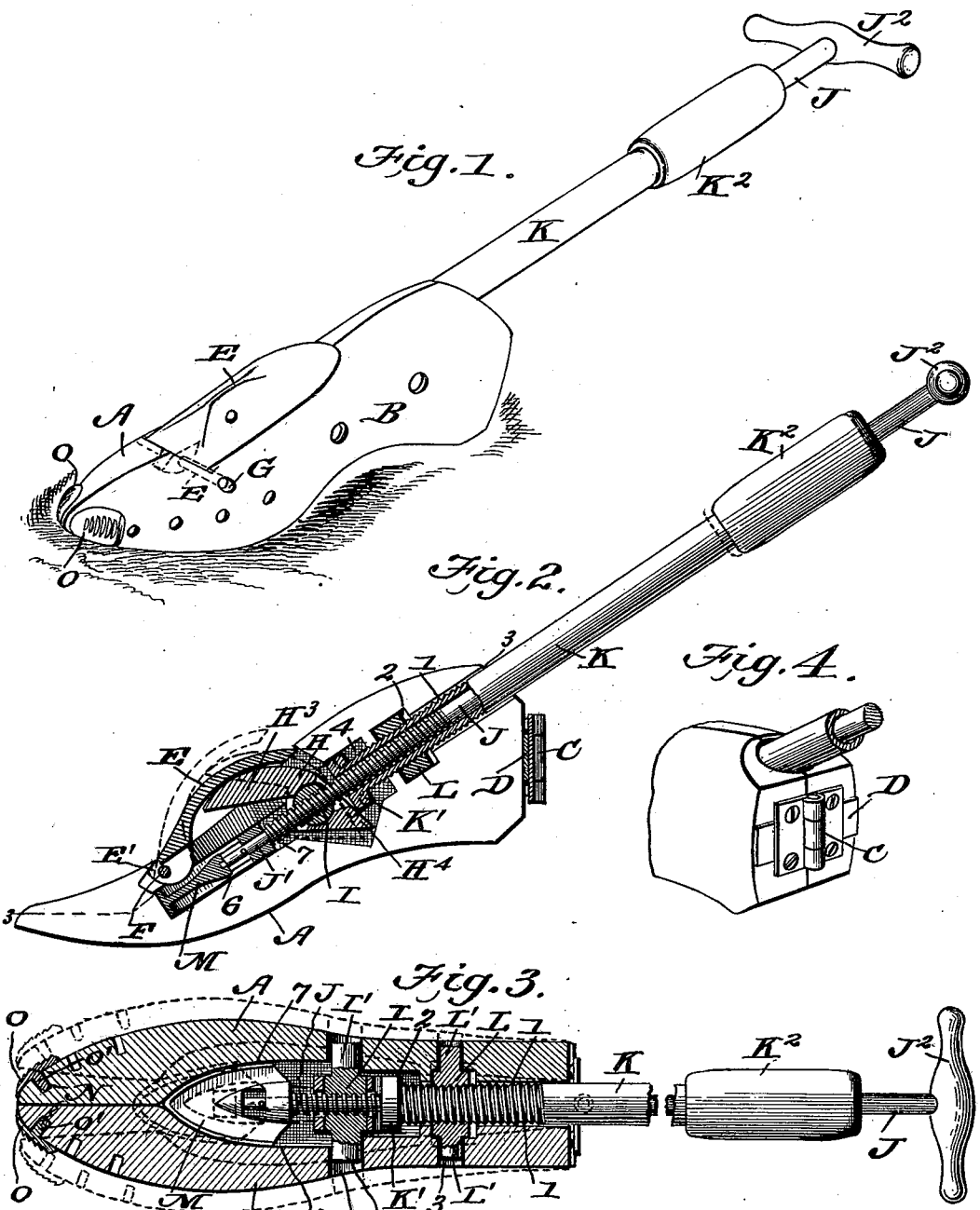
WITNESSES:
M. S. Blondel
Perry B. Turpin
INVENTOR
Mary Jane Hall.
BY Munn & Co.
ATTORNEYS No. 653,575. Patented July 10, 1900.
M. J. HALL.
BOOT TREE.
(Application filed Dec. 6, 1899.)
(No Model.) 2 Sheets—Sheet 2.
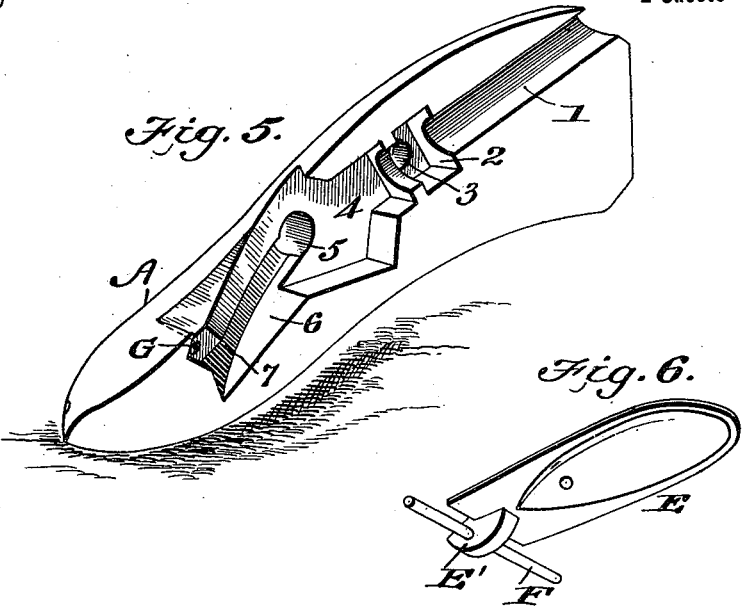
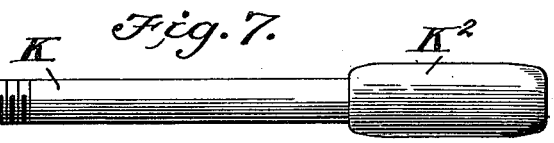
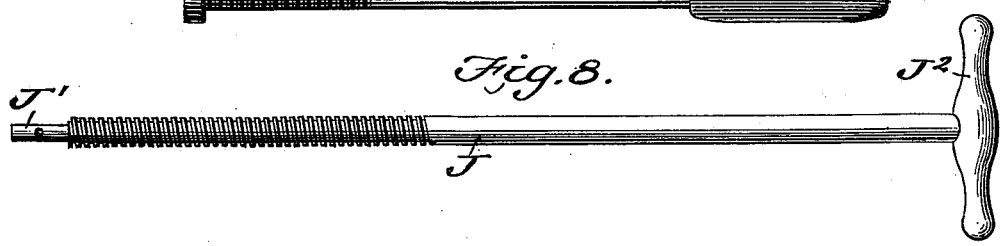
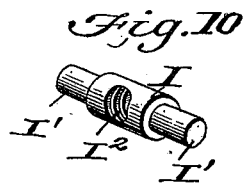
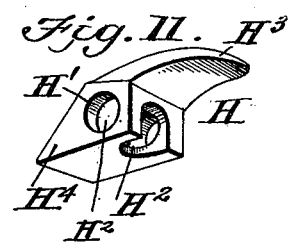
WITNESSES: INVENTOR
M. D. Blondel, Mary Jane Hall.
Perry B. Turpin. BY Munn + Co.
ATTORNEYS
THE NORRIS PETERS CO., PHOTO-LITHO., WASHINGTON, D. C.

UNITED STATES PATENT OFFICE.

MARY JANE HALL, OF ASPEN, COLORADO, ASSIGNOR OF TWO-THIRDS TO JOHN ARMITAGE HALL AND LOUIS R. FECHTIG, OF SAME PLACE.

BOOT-TREE.

SPECIFICATION forming part of Letters Patent No. 653,575, dated July 10, 1900.

Application filed December 6, 1899. Serial No. 739,393. (No model.)

*To all whom it may concern:*

Be it known that I, MARY JANE HALL, residing at Aspen, in the county of Pitkin and State of Colorado, have invented a new and useful Improvement in Boot-Trees, of which the following is a specification.

My invention is an improvement in trees for use in boots and shoes; and it consists in certain novel constructions and combinations of parts, as will be hereinafter described, and pointed out in the claims.

In the drawings, Figure 1 is a perspective view, and Fig. 2 a side view, partly in section, of a tree embodying my invention. Fig. 3 is a sectional view on about line 3 3 of Fig. 2. Fig. 4 is a detail rear perspective view of the tree, parts being broken away. Fig. 5 is a perspective view of the right-hand section of the tree-body. Fig. 6 is a perspective view of the instep-block. Figs. 7 and 8 are side views, respectively, of the adjusting-sleeve and the screw-shaft. Fig. 9 is a perspective view of the flaring-point for spreading the sections of the body of the tree. Fig. 10 is a detail perspective view of the bearing-piece for the screw-shaft. Fig. 11 is a detail perspective view of the block for adjusting the instep-piece, and Fig. 12 is a detail perspective view of the bearing-piece for the screw-sleeve.

The body of the tree is made in two sections A and B, which are provided in their inner abutting faces with ways 1 for the screw-sleeve, recesses 2 to receive the bearing-pieces for said sleeve and having openings 3 for the trunnions of said pieces, recesses 4 to receive the instep-block and its operating devices and provided with openings 5 for the trunnions of the bearing-piece for the screw-shaft, and recesses 6 for the spreading-point on such shaft, said recesses 6 having inclined walls 7, against which the tapered spreading piece or point operates to spread the tree.

The sections A and B are connected at their rear ends by a leaf-hinge C, so their front ends may open and close, and such front ends are normally pressed together by a spring D, which is shown as a spring-plate arranged between the leaves of the hinge C and the ends of the sections A and B and secured by said hinge, as is best shown in Fig. 4.

The instep-block E (shown in detail in Fig. 6) is provided at its front end with the shaft F, carried by the lug E' and projecting on opposite sides of the said lug to enter openings G, formed in the sections A and B. By this construction the block E is pivotally secured to the sections A and B, so it can be conveniently removed when desired by simply opening the front end of the tree, and it is also so secured that it will not be affected by the adjustments of the sections A and B in the ordinary use of the tree. This instep-block E is operated from below by the block H. (Shown in detail in Fig. 11.) This block or rocker H is provided with a transverse opening H' from side to side which journals on the short rocker-piece I, in which the screw-shaft J is threaded, and the block H also has a transverse opening $H^2$ from front to rear through which the screw-shaft J passes. At its upper side the block H is provided with an arm $H^3$, which is preferably curved slightly and is adapted to bear beneath the instep-block and lift the latter when the block H is properly operated. To operate the block H, I provide it with an extension-arm $H^4$, preferably on its under side and arranged for abutment by the lower end K' of the screw-sleeve K.

The sleeve K is threaded in its bearing-block L, whose trunnions L' fit in the openings 3 in the sections A and B, so the turning of said sleeve K will cause the same to move longitudinally within the tree, a suitable handle being provided at $K^2$ on the said sleeve, so it can be easily turned as may be desired. The lower end K' of the sleeve K is preferably broadened and is arranged to bear against the arm $H^4$ of the block H in such manner as to rock the said block and cause its arm $H^3$ to rise and lift the instep-block E, when the sleeve K is turned to cause it to move longitudinally into the body of the tree. By this construction the instep-block may be forcibly elevated to any desired degree.

The bearing-piece I for the screw-shaft is arranged within the block H and has its trunnions I' fitted in the openings 5 and its thread-opening $I^2$ in register with the opening $H^2$ in the block H, so the screw-shaft J may operate in the opening I² and pass through the opening H² in the block H. By this arrangement the operating block or rocker H is conveniently supported upon the bearing-piece I without in any manner interfering with said bearing-piece, as will be readily understood from Figs. 2 and 4 of the drawings.

The screw-shaft J passes through the sleeve K, is threaded in the opening I², and is swiveled at its inner end J' to the spreading-block M, which is tapered at its front end and bears at such end against the inclined walls 7 of the sections A and B and operates to open the tree when the screw-shaft is turned to move the same into the tree. The shaft J has a handle J², by which it may be turned to force the sections A and B apart or be retracted so such sections can be closed by the action of the spring D, as before described.

In their outer sides, near their front ends, the sections A and B are provided with sockets N, in which may be fitted the studs O' on the inner sides of the corrugated plates O, which may be supported upon the tree-sections, as shown in Fig. 1, and will operate to prevent any slipping of the said sections in the use of the tree.

When desired, the corrugated protuberances O may be made integral with the last.

Having thus described my invention, what I claim, and desire to secure by Letters Patent, is—

1. A tree comprising the body-section, the instep-block, the rocker pivoted between its ends and having an arm engaging said block and an arm for engagement by the operating device, and such device engaging said arm substantially as set forth.

2. In a tree, substantially as described, the combination of the body-sections, the screw-shaft provided with means for spreading such sections, the bearing-piece having a threaded bearing for said screw-shaft, the rocker supported on said bearing-piece and provided with an arm for operating the instep-block and with an arm for engagement by the screw-sleeve, the screw-sleeve and its bearing, and the instep-block arranged for operation by the rocker, substantially as set forth.

3. In a tree, the combination of the body-sections, the screw-shaft arranged to spread said sections, the instep-block, the bearing-piece having a threaded bearing for the screw-shaft, the rocker supported on the bearing-piece and arranged to operate the instep-block, and the screw-sleeve arranged to engage and operate the rocker, substantially as set forth.

4. A tree, comprising the sections, the leaf-hinge connecting the said sections, and the spring for closing said sections arranged adjacent to and held by the hinge which connects said sections, substantially as set forth.

5. The combination in a tree, of the body-sections the hinge connecting the rear ends of said sections, and the actuating-spring composed of a plate extending between the rear ends of the sections, substantially as set forth.

6. In a tree substantially as described, the combination of the body-sections provided in their inner faces with bearing-openings, the instep-block having at its front end a shaft whose ends fit and journal in said openings, and means for operating said instep-block, substantially as set forth.

7. A tree provided with the body-sections and means for operating the same and having said sections provided with the corrugated plates by which to prevent slipping, substantially as described.

8. The combination, in a tree, of the body-sections provided in their inner faces with openings for the bearing-pieces for the shaft and sleeve and for the pivot-shaft of the instep-block, the instep-block having its shaft held in the sections, the bearing-pieces for the shaft and sleeve having their trunnions held in their respective openings, the rocker supported on the bearing-piece for the screw-shaft and having means for operating the instep-block, the screw-shaft having means for spreading the body-sections, the spring for retracting said sections, and the threaded sleeve arranged to operate the rocker, substantially as shown and described.

9. In a tree substantially as described the combination of the body-sections, the screw for spreading the same, the bearing-piece for such screw-shaft, the instep-block, the rocker having an opening for the said screw-shaft and openings fitting over the bearing-piece therefor, and means for operating such rocker substantially as set forth.

MARY JANE HALL.

Witnesses:
A. MULQUEEN,
E. A. BURNS.